US010592432B2

(12) United States Patent
Ash et al.

(10) Patent No.: US 10,592,432 B2
(45) Date of Patent: Mar. 17, 2020

(54) ADJUSTING ACTIVE CACHE SIZE BASED ON CACHE USAGE

(71) Applicant: INTERNATIONAL BUSINESS MACHINES CORPORATION, Armonk, NY (US)

(72) Inventors: Kevin J. Ash, Tucson, AZ (US); Matthew G. Borlick, Tucson, AZ (US); Lokesh M. Gupta, Tucson, AZ (US); Will A. Wright, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/054,772

(22) Filed: Aug. 3, 2018

(65) Prior Publication Data
US 2018/0341599 A1    Nov. 29, 2018

Related U.S. Application Data

(63) Continuation of application No. 15/710,800, filed on Sep. 20, 2017, now Pat. No. 10,169,249, which is a (Continued)

(51) Int. Cl.
*G06F 12/00* (2006.01)
*G06F 13/00* (2006.01)
(Continued)

(52) U.S. Cl.
CPC .......... *G06F 12/128* (2013.01); *G06F 12/122* (2013.01); *G06F 12/123* (2013.01);
(Continued)

(58) Field of Classification Search
CPC ...... G06F 12/00; G06F 12/08; G06F 12/0802; G06F 12/0804; G06F 12/0806;
(Continued)

(56) References Cited

U.S. PATENT DOCUMENTS 5,123,099 A    6/1992  Shibata et al.
5,148,540 A *  9/1992  Beardsley ............. G06F 13/122
                                                      714/5.11
(Continued)

OTHER PUBLICATIONS

T. Saemundsson, et al. "Dynamic Performance Profiling of Cloud Caches", ACM, 2014, pp. 14.
(Continued)

*Primary Examiner* — Tuan V Thai
(74) *Attorney, Agent, or Firm* — David W. Victor; Konrad Raynes Davda & Victor LLP

(57) ABSTRACT

Provided are a computer program product, system, and method for adjusting active cache size based on cache usage. An active cache in at least one memory device caches tracks in a storage during computer system operations. An inactive cache in the at least one memory device is not available to cache tracks in the storage during the computer system operations. During caching operations in the active cache, information is gathered on cache hits to the active cache and cache hits that would occur if the inactive cache was available to cache data during the computer system operations. The gathered information is used to determine whether to configure a portion of the inactive cache as part of the active cache for use during the computer system operations.

20 Claims, 8 Drawing Sheets

Related U.S. Application Data continuation of application No. 14/928,926, filed on Oct. 30, 2015, now Pat. No. 9,824,030.

(51) Int. Cl.
*G06F 12/128* (2016.01)
*G06F 12/122* (2016.01)
*G06F 12/123* (2016.01)

(52) U.S. Cl.
CPC .. *G06F 2212/1024* (2013.01); *G06F 2212/65* (2013.01); *G06F 2212/657* (2013.01); *G06F 2212/684* (2013.01)

(58) Field of Classification Search
CPC ............. G06F 12/0808; G06F 12/0811; G06F 12/128; G06F 12/123
USPC .................. 711/100, 117, 118, 154, 200
See application file for complete search history.

(56) References Cited

U.S. PATENT DOCUMENTS

| | | | | |
|---|---|---|---|---|
| 5,179,687 | A * | 1/1993 | Hidaka | G06F 12/0893 365/193 |
| 5,559,985 | A * | 9/1996 | Maemura | G06F 12/0879 711/118 |
| 5,777,942 | A * | 7/1998 | Dosaka | G11C 11/005 365/230.03 |
| 6,493,810 | B1 | 12/2002 | Pang et al. | |
| 6,754,791 | B1 | 6/2004 | Braceras et al. | |
| 7,752,395 | B1 | 7/2010 | Fair et al. | |
| 8,850,122 | B2 | 9/2014 | Chockler et al. | |
| 9,811,474 | B2 | 11/2017 | Ash et al. | |
| 9,824,030 | B2 | 11/2017 | Ash et al. | |
| 10,169,249 | B2 | 1/2019 | Ash et al. | |
| 2001/0037433 | A1 | 11/2001 | Dempsey et al. | |
| 2003/0088739 | A1 | 5/2003 | Wilkes et al. | |
| 2003/0188104 | A1 | 10/2003 | Sullivan | |
| 2004/0193803 | A1 | 9/2004 | Mogi et al. | |
| 2006/0174067 | A1 | 8/2006 | Soules et al. | |
| 2010/0076805 | A1 | 3/2010 | Batsakis et al. | |
| 2012/0089782 | A1 | 4/2012 | McKean et al. | |
| 2013/0111133 | A1 | 5/2013 | Benhase et al. | |
| 2013/0138889 | A1 | 5/2013 | Chockler et al. | |
| 2015/0046654 | A1 | 2/2015 | Soundararajan et al. | |
| 2015/0286564 | A1 * | 10/2015 | Lim | G06F 12/023 711/159 |
| 2015/0378892 | A1 * | 12/2015 | Tajima | G06F 9/45558 711/118 |
| 2016/0342518 | A1 * | 11/2016 | Park | G06F 12/0811 |
| 2017/0124000 | A1 | 5/2017 | Ash et al. | |
| 2017/0124001 | A1 | 5/2017 | Ash et al. | |
| 2018/0011799 | A1 | 1/2018 | Ash et al. | |
| 2018/0373645 | A1 | 12/2018 | Anderson et al. | |

OTHER PUBLICATIONS

U.S. Appl. No. 14/928,926, filed Oct. 30, 2015.
Office Action dated Feb. 13, 2017, pp. 19, for U.S. Appl. No. 14/928,926.
Response dated May 15, 2017, pp. 13, to U.S. Appl. No. 14/928,926.
Notice of Allowance dated Jul. 7, 2017, pp. 15, for U.S. Appl. No. 14/928,926.
U.S. Appl. No. 15/710,800, filed Sep. 20, 2017.
Office Action dated Apr. 19, 2018, pp. 34, for U.S. Appl. No. 15/710,800.
Response dated Jul. 19, 2018, pp. 10, to Office Action dated Apr. 19, 2018, pp. 34, for U.S. Appl. No. 15/710,800.
U.S. Appl. No. 14/928,948, filed Oct. 30, 2015.
Office Action dated Feb. 10, 2017, pp. 23, for U.S. Appl. No. 14/928,948.
Response dated May 10, 2017, pp. 12, to Office Action dated Feb. 10, 2017, pp. 23, for U.S. Appl. No. 14/928,948.
Notice of Allowance dated Jun. 30, 2017, pp. 15, for U.S. Appl. No. 14/928,948.
U.S. Appl. No. 15/629,249, filed Jun. 21, 2017.
List of IBM Patents or Patent Applications Treated as Related, dated Aug. 3, 2018, pp. 2.
Notice of Allowance dated Aug. 30, 2018, pp. 11, or U.S. Appl. No. 15/710,800.
Notice of Allowance dated Feb. 28, 2019, pp. 27, for U.S. Appl. No. 15/629,249, filed Jun. 21, 2017.
Notice of Allowance dated Sep. 5, 2019, pp. 5, for U.S. Appl. No. 15/629,249, filed Jun. 21, 2017.
Notice of Allowance dated Nov. 26, 2019, pp. 9, for U.S. Appl. No. 15/629,249, filed Jun. 21, 2017.

* cited by examiner

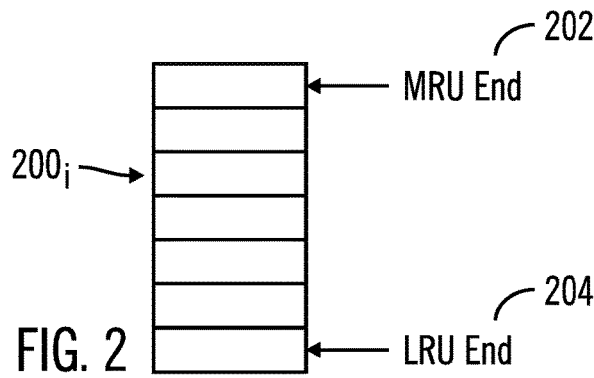
FIG. 2
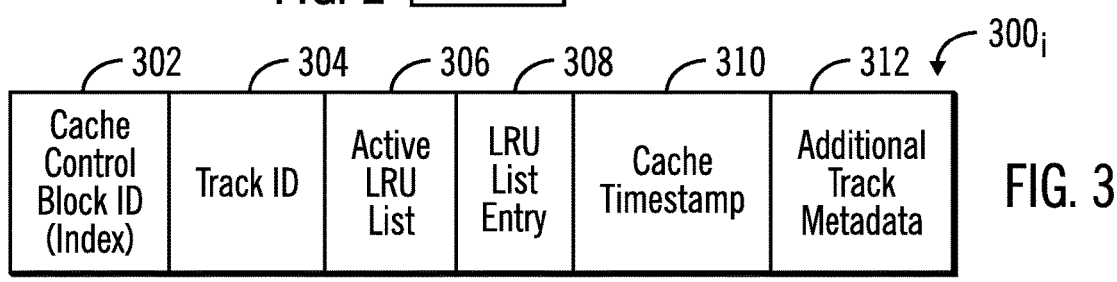
FIG. 3
Active Cache Control Block
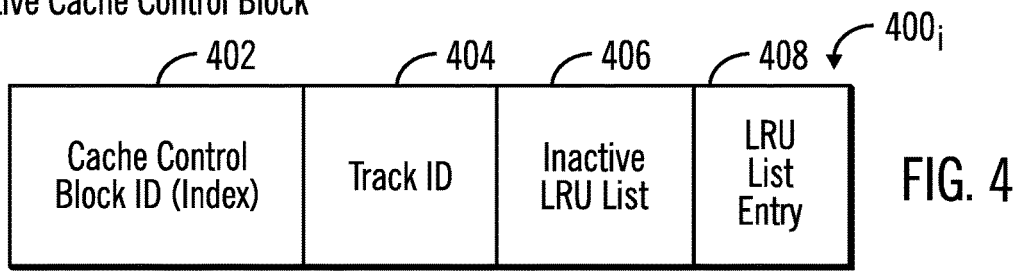
FIG. 4
Inactive Cache Control Block
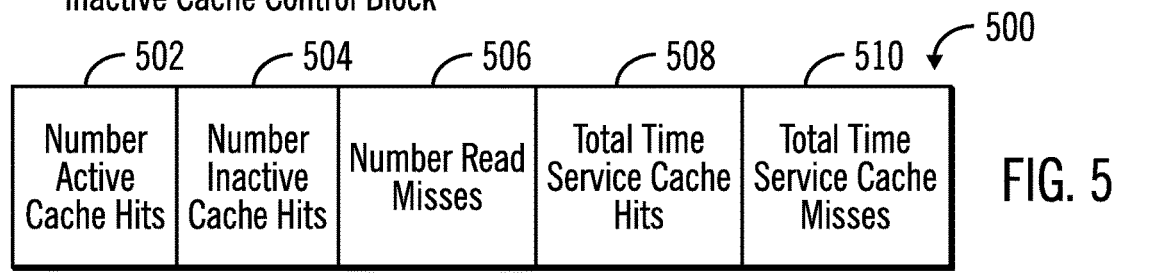
FIG. 5
Gathered Cache Access Statistics
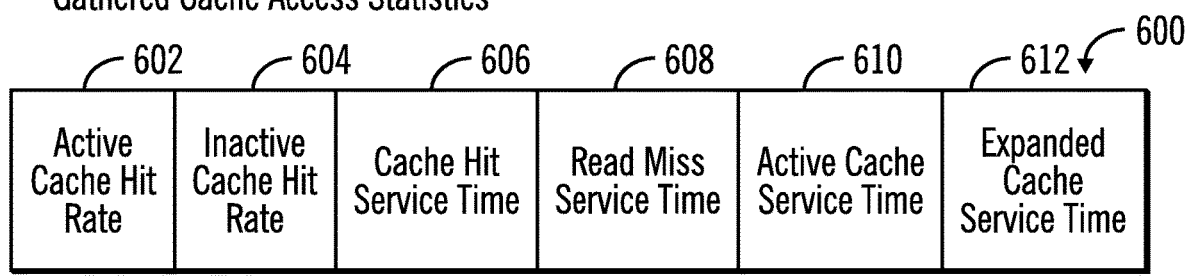
Calculated Cache Access Statistics    FIG. 6

ADJUSTING ACTIVE CACHE SIZE BASED ON CACHE USAGE

BACKGROUND OF THE INVENTION

1. Field of the Invention

The present invention relates to a computer program product, system, and method for adjusting active cache size based on cache usage.

2. Description of the Related Art

A cache management system buffers tracks in a storage device recently accessed as a result of read and write operations in a faster access storage device, such as memory, than the storage device storing the requested tracks. Subsequent read requests to tracks in the faster access cache memory are returned at a faster rate than returning the requested tracks from the slower access storage, thus reducing read latency.

A cache management system may maintain a linked list having one entry for each track stored in the cache, which may comprise write data buffered in cache before writing to the storage device or read data. In the commonly used Least Recently Used (LRU) cache technique, if a track in the cache is accessed, i.e., a cache "hit", then the entry in the LRU list for the accessed track is moved to a Most Recently Used (MRU) end of the list. If the requested track is not in the cache, i.e., a cache miss, then the track in the cache whose entry is at the LRU end of the list may be removed (or destaged back to storage) and an entry for the track data staged into cache from the storage is added to the MRU end of the LRU list. With this LRU cache technique, tracks that are more frequently accessed are likely to remain in cache, while data less frequently accessed will more likely be removed from the LRU end of the list to make room in cache for newly accessed tracks.

There is a need for improved techniques for determining an amount of cache to add to a computing system.

SUMMARY

Provided are a computer program product, system, and method for adjusting active cache size based on cache usage. An active cache in at least one memory device caches tracks in a storage during computer system operations. An inactive cache in the at least one memory device is not available to cache tracks in the storage during the computer system operations. During caching operations in the active cache, information is gathered on cache hits to the active cache and cache hits that would occur if the inactive cache was available to cache data during the computer system operations. The gathered information is used to determine whether to configure a portion of the inactive cache as part of the active cache for use during the computer system operations.

BRIEF DESCRIPTION OF THE DRAWINGS

FIG. 2 illustrates an embodiment of a Least Recently Used (LRU) list.

FIG. 3 illustrates an embodiment of an active cache control block.

FIG. 4 illustrates an embodiment of an inactive cache control block.

FIG. 5 illustrates an embodiment of gathered cache access statistics.

FIG. 6 illustrates an embodiment of calculated cache access statistics.

DETAILED DESCRIPTION

When purchasing memory for computing systems, such as servers, users may not fully anticipate the amount of cache workload that will occur in the system. Thus, users may not purchase enough cache at the time when they initially configure the system in order to reduce costs.

Described embodiments provide techniques to include in the system additional memory modules, but configure less than all the memory space as active cache available to the user for caching operations, leaving the remainder of the memory inactive cache unavailable to cache data. During operations, information on cache usage may be gathered and processed to determine a cache service time of the average access time given the current amount of active cache and an estimation of an expanded cache service time if the active cache was expanded with a portion of the inactive cache. This information may be used to determine whether to use some of the inactive cache with the active cache to improve cache performance.

Figure 1:
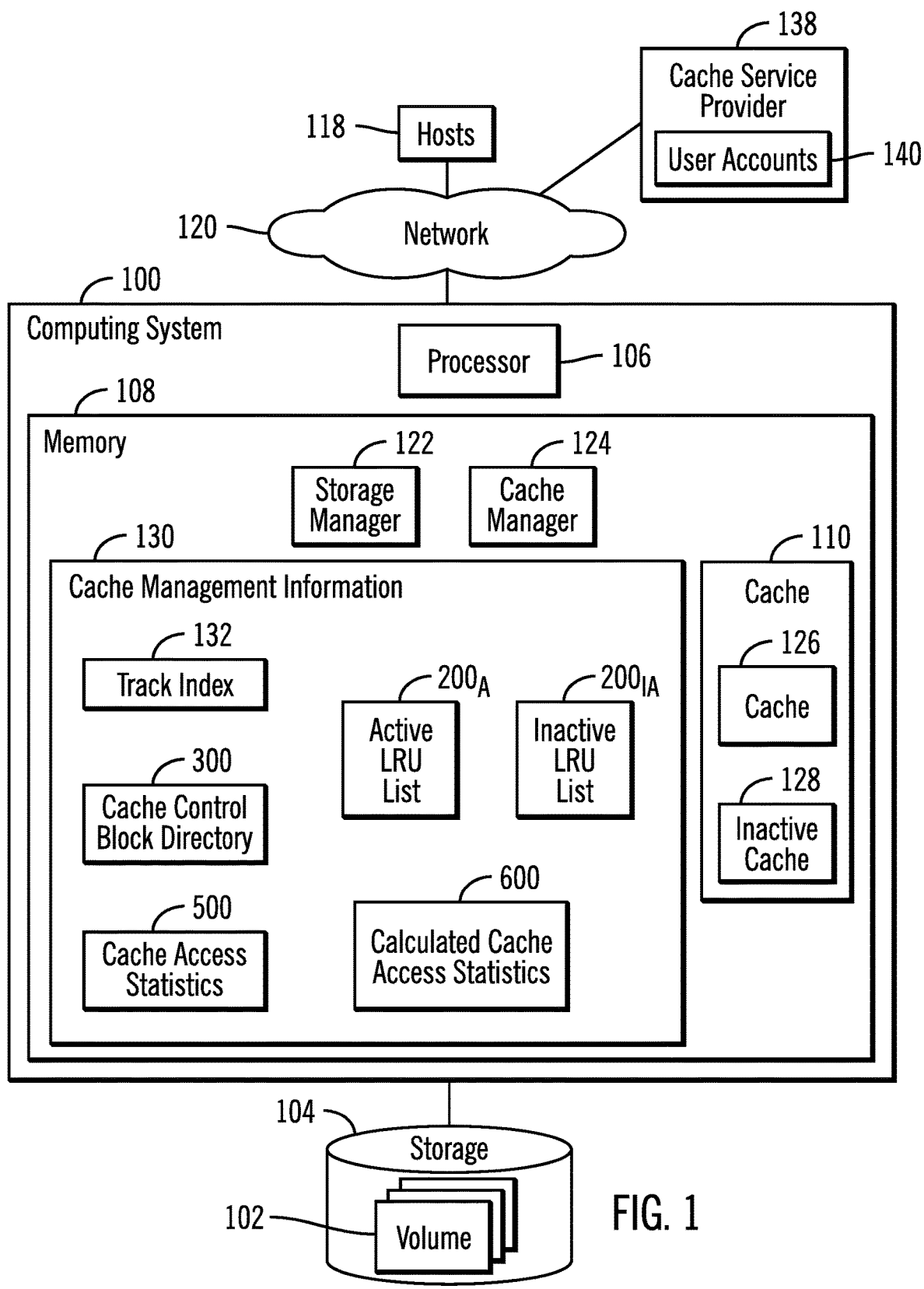
FIG. 1 illustrates an embodiment of a computing environment.

FIG. 1 illustrates an embodiment of a computing environment. A computing system 100 accesses data in volumes 102 (e.g., Logical Unit Numbers, Logical Devices, Logical Subsystems, etc.) configured in a storage 104. The computing system 100 includes a processor 106 and a memory 108, including a cache 110 to cache data for the storage 104. The processor 106 may comprise one or more central processing units (CPUs) or a group of multiple cores on a single CPU. The cache 110 buffers data requested by processes within the computing system. Alternatively, the computing system 100 may comprise a storage controller that processes Input/output (I/O) access requests for tracks in the storage 104 from hosts 118 connecting to the computing system 100 (storage controller) over a network 120.

The memory 108 further includes a storage manager 122 and cache manager 124 The storage manager 122 manages access requests from internal processes in the computing system 100 and/or from hosts 118 for tracks in the storage 104. The cache manager 124 maintains accessed tracks in the cache 110 for future read access to the track to allow the accessed track to be returned from the faster access cache 110 instead of the storage 104. A track may comprise any unit of data configured in the storage 104, such as a track, Logical Block Address (LBA), etc., which is part of a larger grouping of tracks, such as a volume, logical device, etc.

In one embodiment, the cache 110 may be partitioned into an active cache 126 and an inactive cache 128, where the active cache 126 comprises that portion of the physical memory 108 which is used to cache accessed data. The inactive cache 128 comprise that portion of the physical memory 108 which is unavailable to the user and not used to cache user data, but may be subsequently provisioned for use with the active cache as described below. In this way, the memory vendor may sell the user more cache than the user initially needs, but provision a portion (all or part) of the inactive cache 128 as part of the active cache 126 when needed. For instance, if the computing system 100 has a terabyte of cache, the active cache 126 may be initially configured to be some percentage of the total available cache, where the user is restricted from using the inactive cache 128 during operations.

The cache manager 124 maintains cache management information 130 in the memory 108 to manage read (unmodified) and write (modified) tracks in the active cache 126. The cache management information 130 may include a track index 132 providing an index of tracks in the active cache 126 to cache control blocks in a control block directory 300; an active Least Recently Used (LRU) list $200_A$ for tracks in the active cache 126; and an inactive LRU list $200_{IA}$ to indicate tracks that could have been stored in the inactive cache 128 portion had the inactive cache 128 portion been available to store data. The cache control block directory 300 includes the cache control blocks, where there is one cache control block for each track in the active cache 126 providing metadata on the track in the active cache 126. The track index 132 associates tracks with the cache control blocks providing information on the tracks in the active cache 132. Upon determining that the active cache $200_A$ is full or has reached a threshold level, the LRU list $200_A$ is used to determine tracks to demote.

In one embodiment, there may only be cache control blocks 300 for the entries in the active cache 126 and no cache control blocks are allocated for tracks indicated in the inactive LRU list $200_{IA}$. A track indicated in the inactive LRU list $200_{IA}$ is not stored in the inactive cache 128. In an alternative embodiment, the cache control block directory 300 may maintain cache control blocks for tracks indicated in the inactive LRU list $200_{IA}$ even though they are not stored in the cache 110. In one such embodiment using cache control blocks for tracks indicated in the inactive LRU list $200_{IA}$, the cache control blocks used for tracks in the inactive LRU list $200_{IA}$ blocks, may be the same as those used for tracks in the active cache 126, such as shown for FIG. 3, without information specific to the track being maintained in the cache 110. In an alternative embodiment, the cache control block used for track in the inactive LRU list $200_{IA}$ may have fewer fields and less information than those for tracks maintained in the active cache 126, such as shown in FIG. 4. In such embodiments, inactive cache control blocks for tracks in the inactive LRU list $200_{IA}$ may only maintain information about the inactive LRU list $200_{IA}$ where the tracks are indicated. For instance, for a track in the active cache 126, a cache control block $300_i$ may require 256 bytes for a 4K block, but an inactive cache control block $400_i$ for a track only indicated in the inactive LRU list $200_{IA}$ may only comprise 20 bytes.

During caching operations, the cache manager 124 may gather for specific periods of time cache access statistics 500 on access to the active cache 126 and the inactive LRU list $200_{IA}$. The cache manager 124 may further calculate calculated cache access statistics 600, such as cache service times, for the currently used active cache 126 and a hypothetical expanded cache comprising a portion (some or all) of the inactive cache 128 configured for use with the active cache 126.

If based on the calculated cache service times for the active cache 126 and an expanded cache, a determination is made to configure the inactive cache 128 for use with the active cache 126, then the cache manager 124 may communicate with a cache service provider system 138 over the network 120 to initiate a transaction to purchase the portion of the inactive cache 128 configured for use with the active cache 126.

With described embodiments, a vendor of memory devices, such as Dual In Line Memory Modules (DIMMs), may include more memory than a customer needs and at some later time based on access usage provision some or all of the unused memory for use. The cache service provider 138 may maintain user accounts 140 for users having inactive cache resources, and then the cache service provider 138 may initiate a financial transaction to charge the user account 140 for the user of the computing system 100 for using the inactive cache 128. In this way, the memory vendor may encourage users to increase their memory usage by determining when more memory is needed to improve cache access times based on the gathered cache access statistics 500.

In the described embodiments, the lists $200_A$ and $200_{IA}$ comprise LRU lists. In alternative embodiments, the lists $200_A$ and $200_{IA}$ may comprise other types of lists to organize indication of tracks in the cache 110.

The storage manager 122 and cache manager 124 are shown in FIG. 1 as program code loaded into the memory 108 and executed by the processor 106. Alternatively, some or all of the functions may be implemented in hardware devices in the storage controller 104, such as in Application Specific Integrated Circuits (ASICs).

The storage 104 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 108 may comprise one or more a suitable volatile or non-volatile memory devices, including those described above. The active cache 126 and inactive cache 128 may be configured in separate memory devices, such as separate Dual In Line Memory Modules (DIMMs), or on the same memory devices.

The network 120 may comprise a Storage Area Network (SAN), a Local Area Network (LAN), a Wide Area Network (WAN), the Internet, and Intranet, etc.

FIG. 2 illustrates an embodiment of one of the LRU lists $200_i$, such as LRU lists $200_A$ and $200_{IA}$, as having a most recently used (MRU) end 202 identifying a track most recently added to the active cache 126 or most recently accessed in the cache 126 and a least recently used (LRU) end 204 from which the track identified at the LRU end 204 is selected to demote from the cache active cache 126. The LRU end 204 points to a track identifier, such as a track identifier address or a cache control block index for the track, of the track that has been in the active cache 126 the longest for tracks indicated in that list $200_A$. The inactive LRU list $200_{IA}$ identifies tracks that could have been stored in the cache if the portion of the inactive cache 128 was provisioned for use with the active cache 126.

FIG. 3 illustrates an embodiment of an active cache control block $300_i$ for one of the tracks in the active cache 126, including, but not limited to, a cache control block identifier 302, such as an index value of the cache control block $300_i$; a track ID 304 of the track in the storage 104; the active LRU list 306 in which the cache control block $300_i$ is indicated; an LRU list entry 308 at which the track is indicated; a cache timestamp 310 indicating a time the track was added to the cache 116 and indicated on the LRU list 304; and additional track metadata 312 typically maintained for tracks stored in an active cache 126.

FIG. 4 illustrates an embodiment of an inactive cache control block $400_i$ that may be maintained for a track indicated in the inactive LRU list $200_{IA}$, but not stored in the cache 110. The inactive cache control block $400_i$ includes fields 402, 404, 406, and 408 having the same type of information in fields 302, 304, 306, 308, respectively, in the active cache control block $300_i$, but providing information on the inactive LRU list 128 and entry in the inactive LRU list 128 entry for the track. The cache control block directory 300 may include active and inactive cache control blocks.

FIG. 5 illustrates an embodiment of gathered access statistics 500 the cache manager 124 gathers periodically during caching operations, including a number of active cache hits 502 comprising access requests to tracks indicated in the active LRU list $200_A$ in the active cache 126; a number of inactive cache hits 504 comprising access requests to tracks indicated in the inactive LRU list $200_{IA}$ that are not in the cache 110; a number of read misses indicating a number of access requests to tracks not in the active cache 126; total time service cache hits 508 indicating a total accumulated time to service access requests when the track is in the active cache 126; and a total time to service cache misses 510 indicating a total accumulated time to access requested tracks not indicated in the active cache 126 from the storage 104 to return to a request.

FIG. 6 illustrates an embodiment of calculated cache access statistics 600 calculated from the gathered access statistics 500, including a cache hit rate 602 comprising the number of active cache hits 502 divided by total cache accesses during the measured time period; an inactive cache hit rate 604 comprising the number of inactive cache hits 504 divided by total cache accesses during the measured time period; a cache hit service time 606 comprising the total time service cache hits 508 divided by the number active cache hits 502; read miss service time 608 comprising a total time service cache misses 510 divided by the number of read misses 506; an active cache service time 610 comprising an average service time based on time to service cache hits and misses when only the active cache 126 is provisioned; and an estimated expanded cache service time 612 comprising a service time based on time to service cache hits and misses if the portion of the inactive cache 128 was configured for use with the active cache 126.

Figure 7:
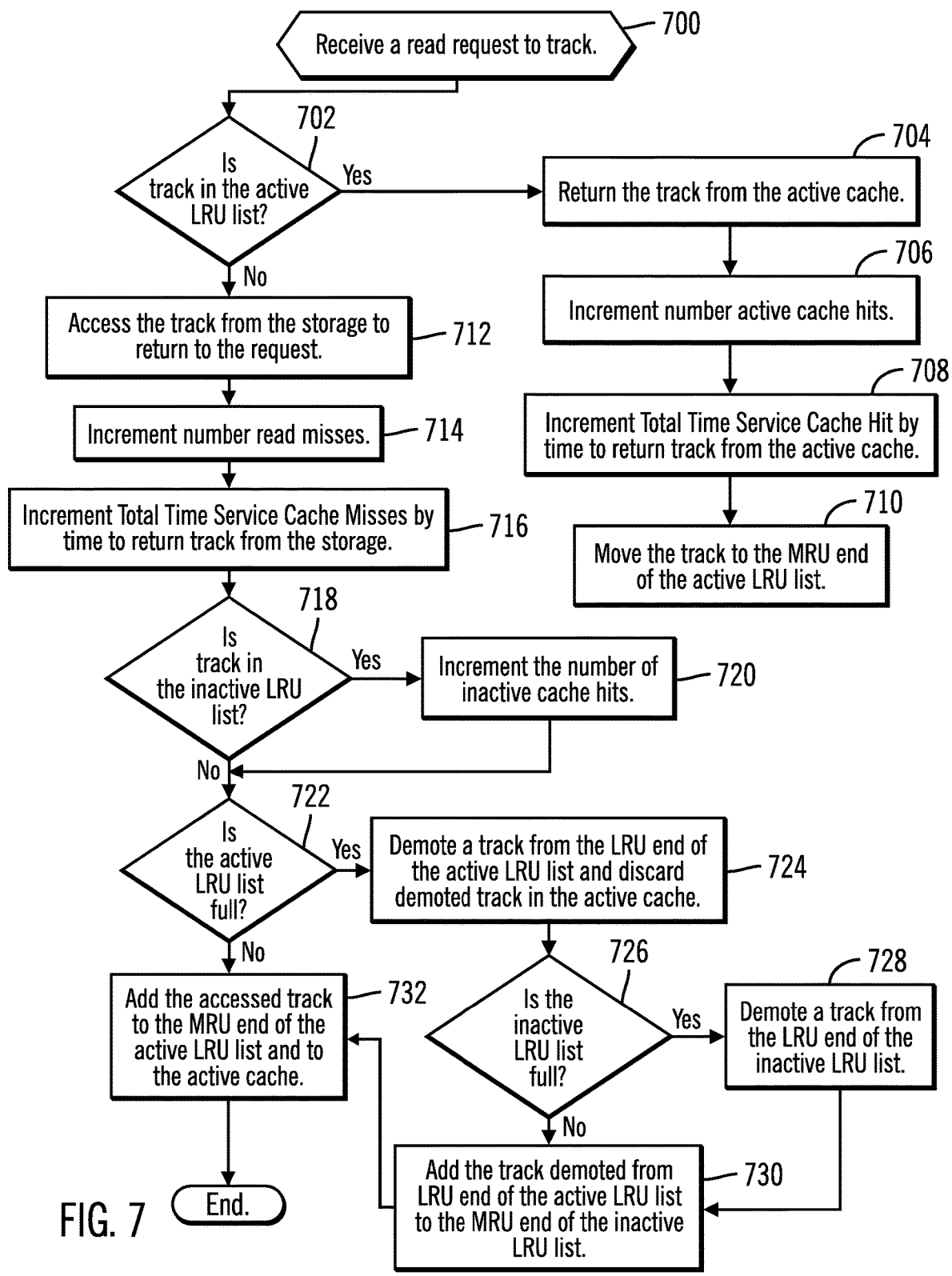
FIG. 7 illustrates an embodiment of an operation to process a read request to a track.

FIG. 7 illustrates an embodiment of operations performed by the cache manager 124 to process a read request to a track in the storage 104. Upon receiving (at block 700) a read request to a track, if (at block 702) the track is indicated in the active LRU list $200_A$, then the track is returned (at block 704) to the request from the active cache 126 and the number of active cache hits 502 is incremented (at block 706). The total time to service cache hits 508 is incremented (at block 708) by the time to return the requested track from the active cache 126. Indication of the accessed track is moved (at block 710) to the MRU end 202 of the active LRU list $200_A$.

If (at block 702) the track is not indicated in the active LRU list $200_A$, then the track is accessed (at block 712) from the storage 104 to return to the request. The cache manager 124 increments (at block 714) the number of read misses 506 and increments (at block 716) the total time service cache misses 510 by the time to return the track from the storage 104. If (at block 718) the track is in the inactive LRU list $200_{IA}$, the cache manager 124 increments (at block 720) the number of inactive cache hits 504 because if the inactive cache 128 was used, there would have been a cache hit. From block 720 or if the track is not in the inactive LRU list $200_{IA}$, if (at block 722) the active LRU list $200_A$ is full, the track at the LRU end 204 of the active LRU list $200_A$ is demoted (at block 724) and discarded from the active cache 126.

If (at block 726) the inactive LRU list $200_{IA}$ is full, then the cache manager 124 demotes (at block 728) indication of a track from the LRU end 204 of the inactive LRU list $200_{IA}$. From block 728 or if the inactive LRU list $200_{IA}$ is not full, then the cache manager 122 adds (at block 730) the track demoted from the LRU end 204 of the active LRU list $200_A$ to the MRU end 202 of the inactive LRU list $200_{IA}$. In this way, the inactive LRU list $200_{IA}$ provides a virtual representation of the track as in cache, even though it is not in cache 110, by indicating the track on the inactive LRU list $200_{IA}$. From block 730 or if the active LRU list $200_A$ is not full (from block 722), the cache manager 124 adds (at block 732) indication of the accessed track to the MRU end 204 of the active LRU list $200_A$ and adds the track to the active cache 126.

When adding a track to the active cache 126, the cache control block $300_i$ for that address in the active cache 126 would be updated to include information on the track and the entry in the active LRU list $200_A$ indicating the track. Further, the track index 132 would be updated to include the cache control block index for the track in the active cache 126. In one embodiment, if a track is indicated in the inactive LRU list $200_{IA}$, there is no cache control block created for the track and indicated in the cache control block directory 300. In an alternative embodiment, a full cache control block $300_i$ may be created in the cache control block directory 300 for the track indicated in the inactive LRU list $200_{IA}$. In a still further alternative embodiment, a smaller inactive cache control block $400_i$ may be added to the cache control block directory 300 for the track indicated in the inactive LRU list $200_{IA}$ having minimal information to identify the track in the inactive LRU list $200_{IA}$. The cache control block index for the inactive cache control block $400_i$ may be added to the track index 132 for the track indicated in the inactive LRU list $200_{IA}$.

With the described embodiments of FIG. 7, tracks demoted from the active LRU list $200_A$ and removed from the cache 110 are added to the inactive LRU list $200_{IA}$ where accesses to the track once removed from the cache 110 can be tracked as if the track is in the cache 110. These accesses to the track indicated on the inactive LRU list $200_{IA}$ can be used to estimate the cache performance that would be realized if the inactive cache 128 was configured to be part of the active cache 126 and available for caching tracks.

Figure 8:
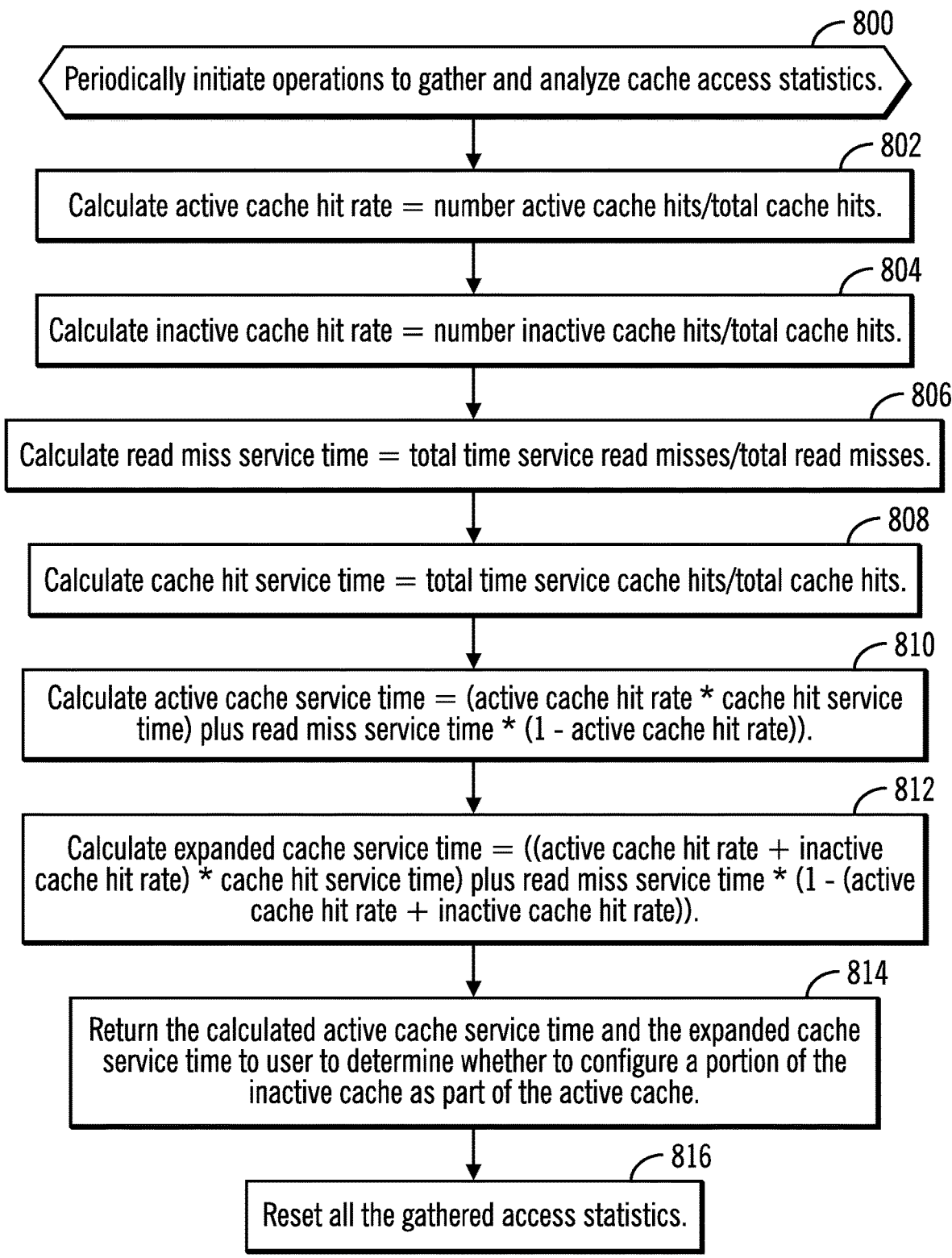
FIG. 8 illustrates an embodiment of operations to calculate cache access statistics.

FIG. 8 illustrates an embodiment of operations performed by the cache manager 124 (or some other component) to periodically initiate operations to gather and analyze cache access statistics. Upon initiating (at block 800) such operations, the cache manager 124 calculates (at block 802) the active cache hit rate 602 as the number active cache hits 502 divided by the total cache hits during the measurement time period. The inactive cache hit rate 604 is calculated (at block 804) as the number inactive cache hits 504 divided by the total cache hits during the measurement time period. The cache manager 124 calculates (at block 806) the read miss service time 608 as the total time service cache misses 510 divided by the total read misses 506. The cache hit service time 606 is calculated (at block 808) as the total time service cache hits 508 divided by the total active cache hits 502.

The cache manager 124 may then calculate (at block 810) the active cache service time 610 as follows:

(active cache hit rate 602*cache hit service time 606)+read miss service time 608*(1−active cache hit rate 602)

The cache manager 124 may then calculate (at block 812) the estimated expanded cache service time 612 when the inactive cache 128 is presumed to have been used as:

((active cache hit rate 602+inactive cache hit rate 604)*cache hit service time 606)+read miss service time 608*(1−(active cache hit rate 602+ inactive cache hit rate 604)).

The calculated active cache service time 610 and the estimated expanded cache service time 612 are returned (at block 814). The active cache service time 610 indicates an average time to service requests when only the active cache 126 is used. The estimated expanded cache service time 612 indicates an estimated time to service requests if both the active cache 126 and a portion of the inactive cache 128 are used. After performing all calculations, the gathered access statistics 500 are reset (at block 816).

Figure 9:
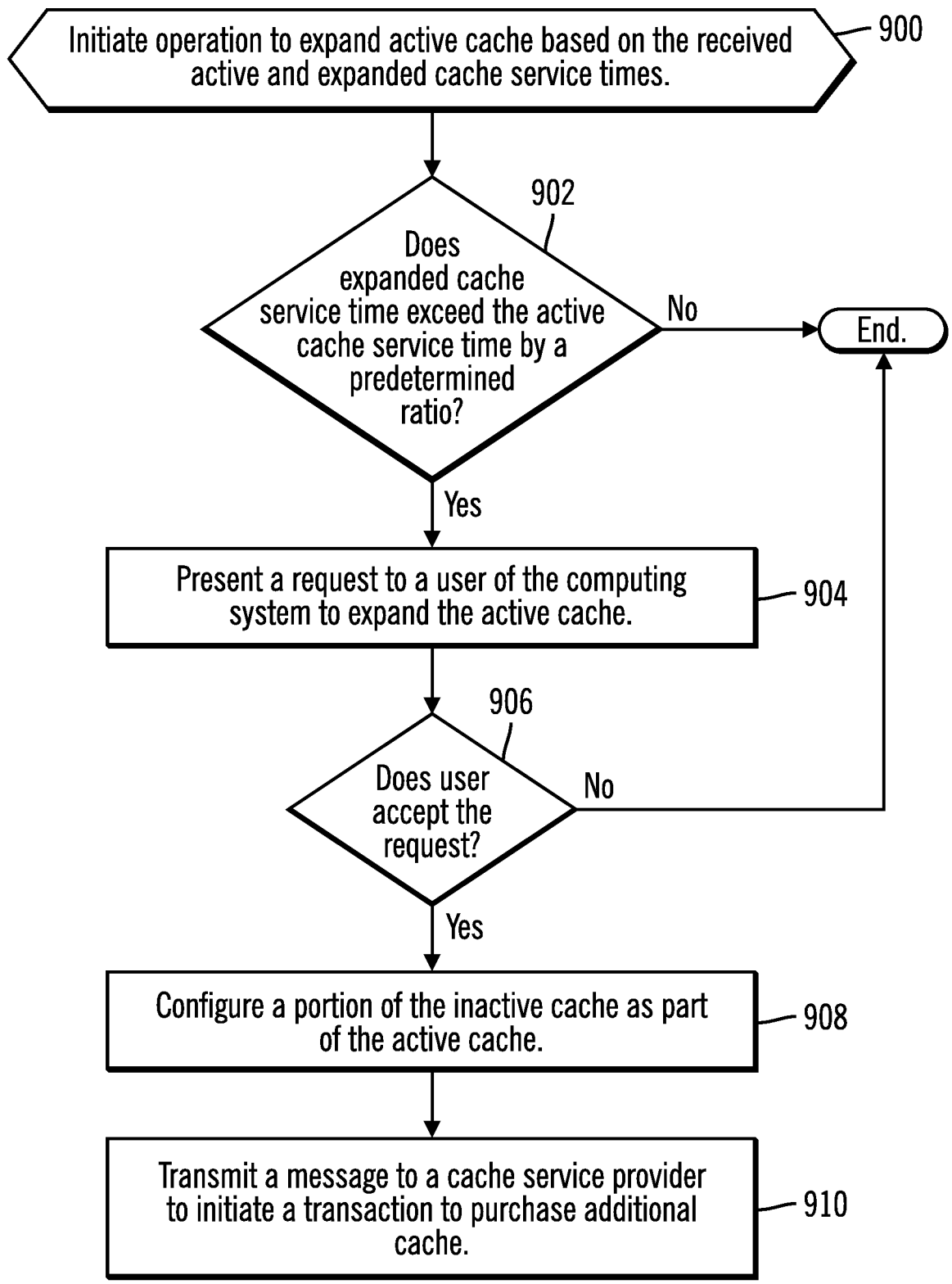
FIGS. 9, 10, and 11 illustrates embodiments of operations to expand the active cache with the inactive cache.

FIG. 9 illustrates an embodiment of operations performed by the cache manager 124 (or some other component in the computing system 100) to use the returned active cache service time 610 and the estimated expanded cache service time 612 to determine whether to activate some of the inactive cache 128 to improve cache performance to approximate the estimated expanded cache service time 612. Upon initiating (at block 900) operations to expand the active cache 126, the cache manager 124 determines (at block 902) whether the estimated expanded cache service time 612 exceeds the active cache service time 610 by a predetermined ratio, e.g., 50% more. If so, then the cache manager 124 presents (at block 904) a request to the user of the computing system 100, such as through a notification in the display screen, to expand the active cache 126. The request may indicate the potential improvement based on the expanded cache service time 612 as compared to the active cache service time 610, may indicate a cost of adding a portion of the inactive cache 128, and may include a graphical button the user may select to expand the active cache 126. If (at block 906) the user accepts the request to expand the active cache 126, then the cache manager 124 configures (at block 908) a portion (some or all) of the inactive cache 128 as part of the active cache 126. The cache manager 124 may transmit (at block 910) a message to the cache service provider 138 to initiate a transaction to purchase the additional inactive cache 128 added to the active cache 126, which may be charged to the user account 140. The charges may comprise periodic charges for certain time intervals during which the portion of the inactive cache 128 is added to the active cache 126. If the predetermined ratio is not exceeded (from the no branch of block 902) or the user does not accept the request to expand the active cache (at block 906) control ends without provisioning some of the inactive cached 128 to the active cache 126.

Figure 10:
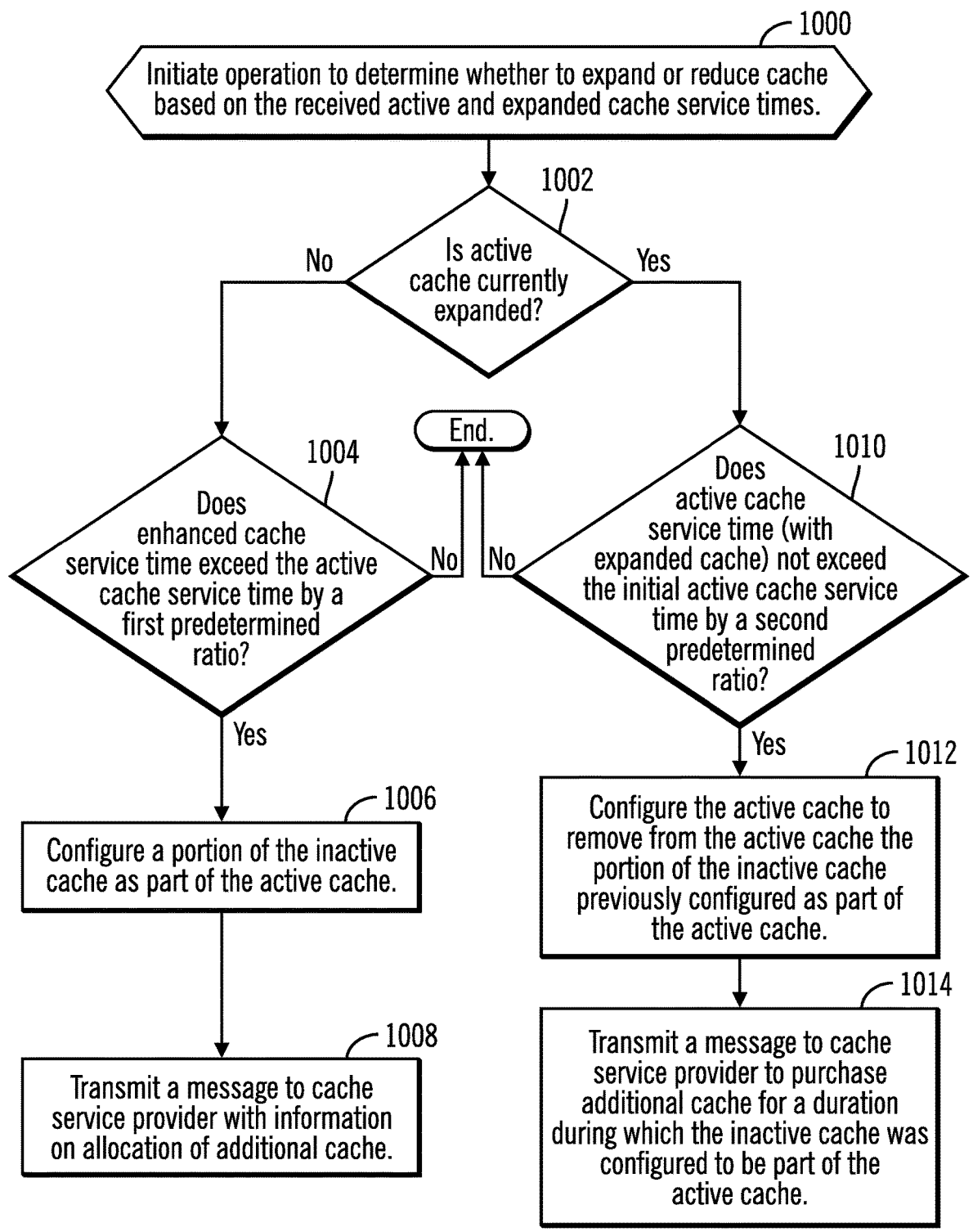

FIG. 10 illustrates an alternative embodiment of operations performed by the cache manager 124 (or some other component in the computing system 100) to use the returned active cache service time 610 and the estimated expanded cache service time 612 to determine whether to expand or reduce the active cache 126 size. Upon initiating (at block 1000) such operations, if (at block 1002) the active cache 126 has not already been expanded to include a portion of the inactive cache 128, the cache manager 124 determines (at block 1004) whether the estimated expanded cache service time 612 exceeds the active cache service time 610 by a first predetermined ratio, e.g., 50% more. If so, then the cache manager 124 configures (at block 1006) a portion (some or all) of the inactive cache 128 as part of the active cache 126. The cache manager 124 may transmit (at block 1008) a message to the cache service provider 138 to initiate a transaction to purchase the additional inactive cache 128 added to the active cache 126, which may be charged to the user account 140. The charges may comprise periodic charges for certain time intervals during which the portion of the inactive cache 128 is added to the active cache 126. If (at block 1004) the first predetermined ratio is not exceeded, then control ends.

If (at block 1002) the active cache 126 has already been expanded to include a portion of the inactive cache 128, then the cache manager 124 determines (at block 1010) whether the active cache service time (with the expanded cache) not exceed an initial active cache service time by a second predetermined ratio, which may be less than the first predetermined ratio. After the cache has been expanded, the cache manager may maintain statistics to determine the actual expanded cache service time and an estimated cache service time if the cache was not expanded. If (at block 1010) the expanded active cache is not exceeding how the cache would perform with just the active cache 126 by a sufficient ratio, then the cache manager 124 configures (at block 1012) the active cache 126 to remove from the active cache the portion of the inactive cache 128 previously configured as part of the active cache 126. The cache manager 124 may transmit (at block 1014) a message to the cache service provider 138 to purchase additional cache for a duration during which the inactive cache 128 was configured to be part of the active cache 126. If (at block 1010) the second predetermined ratio is exceeded, then control ends.

Figure 11:
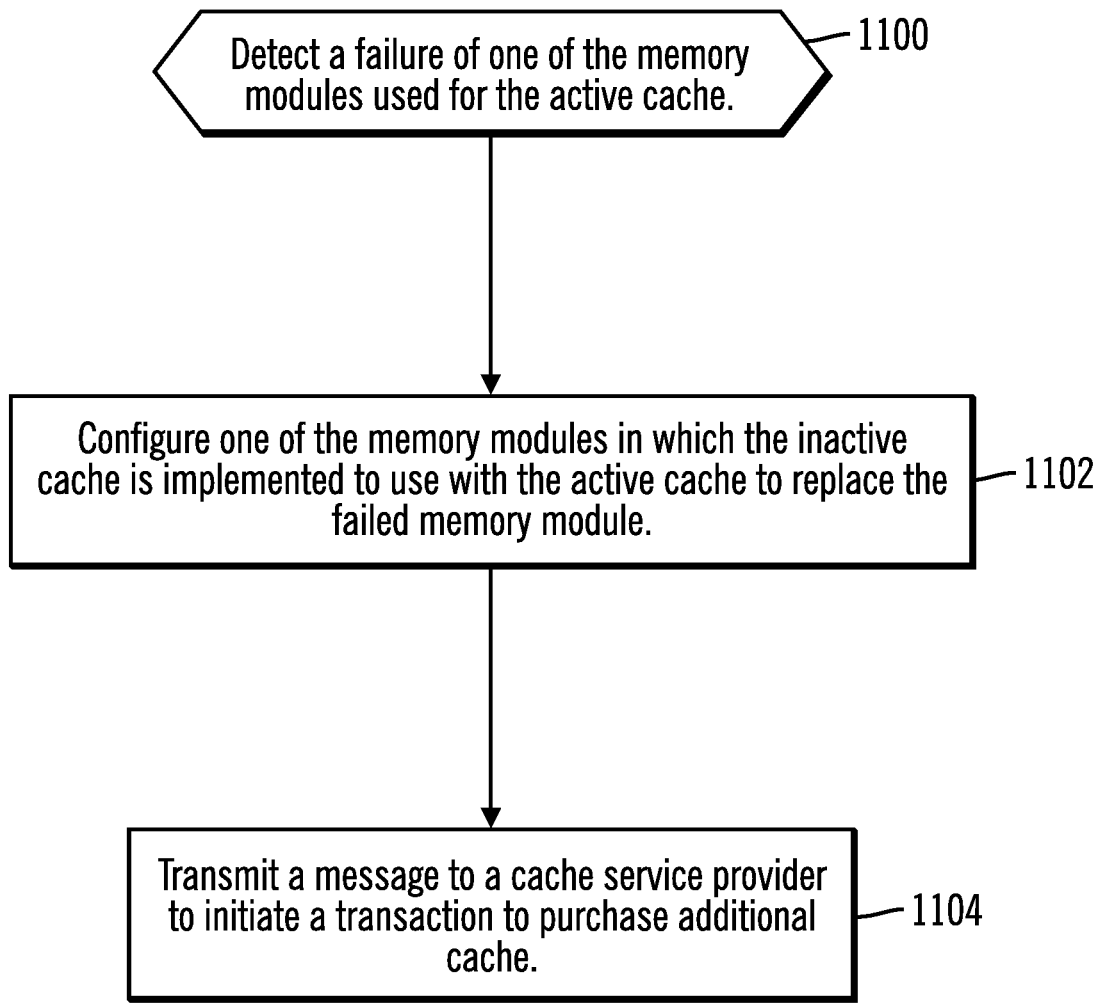

FIG. 11 illustrates a yet further embodiment for how the inactive cache 128 may be provisioned for use. Upon detecting (at block 1100) a failure of one of the memory modules, e.g., DIMMs, used for the active cache 126, then the cache manager 124 may configure (at block 1102) one of the memory modules in which the inactive cache 128 is implemented to use with the active cache 126 to replace the failed memory module. The cache manager 124 may then transmit a message to the cache service provider 128 to initiate a transaction to purchase on behalf of the user account 140 for the computing system 100 the additional inactive cache 138 added to the active cache 126 to replace a failed memory module.

In the embodiments of FIGS. 9, 10, and 11, when configuring the inactive cache 128 to add to the active cache 126, the cache manager 124 may need to add cache control blocks $300_i$ (FIG. 3) to the cache control block directory 300 for the tracks added from the inactive cache 128 to the active cache 126, as well as add entries to the active LRU list $200_A$ for the added portions of the inactive cache 128. In embodiments, where the cache control block directory 300 includes the shortened inactive cache control blocks $400_i$ for inactive cache 128 entries, the cache manager 124 would convert the inactive cache control blocks $400i$ to full active cache control blocks $300_i$ for tracks entries in the inactive cache 128 added to the active cache 126.

In the described embodiment, the variable "i" when used with different elements may denote a same or different instance of that element.

With the described embodiments, the vendor may include additional memory in the memory device that is used as active cache. Then during operations the system may assign a portion of the inactive cache to use with the active cache if gathered usage statistics indicate the performance benefits of adding the inactive cache would significantly improve performance. At this time, the user may be charged for the additional cache resources allocated as active cache. With the described embodiments, a user may easily expand their cache size based on cache usage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
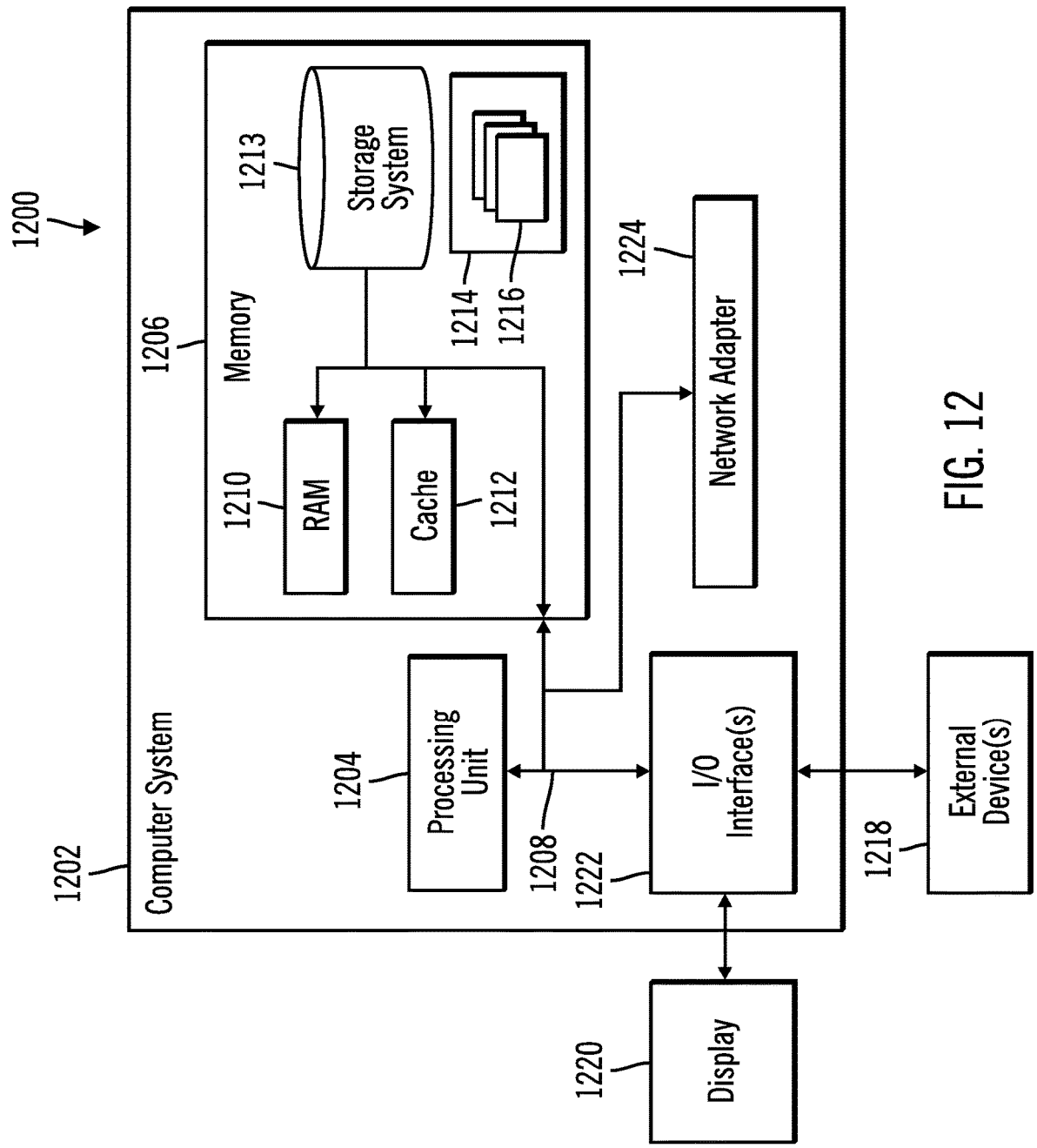
FIG. 12 illustrates a computing environment in which the components of FIG. 1 may be implemented.

The computational components of FIG. 1, including the hosts 118, cache service provider 138, and computing system 100 may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing cache in at least one memory device in a computer system to cache tracks stored in a storage, the computer program product comprising a computer readable storage medium having computer readable program code embodied therein that when executed performs operations, the operations comprising:
    maintaining an active cache list indicating tracks in an active cache comprising a first portion of the at least one memory device to cache the tracks in the storage during computer system operations;
    maintaining an inactive cache list indicating tracks demoted from the active cache;
    during caching operations, gathering information on active cache hits comprising access requests to tracks indicated in the active cache list and inactive cache hits comprising access requests to tracks indicated in the inactive cache list, wherein the gathered information indicates cache hits and cache performance that would be realized if an inactive cache was configured for use with the active cache; and
    using the gathered information to determine whether to provision a second portion of the at least one memory device unavailable to cache user data to be part of the active cache for use to cache user data during the computer system operations.

2. The computer program product of claim 1, wherein the operations further comprise:
    providing an active Least Recently Used (LRU) list in which tracks included in the active cache are indicated, wherein the inactive cache list comprises an inactive LRU list.

3. The computer program product of claim 1, wherein the operations further comprise:
    in response determining that the active cache list is full:
        demoting a track from the active cache list to provide space in the active cache list for a track requested by an access request;
        determining whether the inactive cache list is full;
        demoting a track from the inactive cache list in response to determining that the inactive cache list is full; and
        adding the track demoted from the active cache list to the inactive cache list.

4. The computer program product of claim 1, wherein tracks indicated in the inactive cache list are not stored in the at least one memory device.

5. The computer program product of claim 1, wherein the operations further comprise:
    determining whether to provision a second portion of the at least one memory device unavailable to cache user data to be part of the active cache; and
    configuring the second portion to be part of the active cache to cache user data during the computer system operations.

6. The computer program product of claim 5, wherein the operations further comprise:
    presenting a request to a user to expand the active cache in response to determining to provision the second portion of the at least one memory device;
    receiving, from the user, acceptance of the request, wherein the configuring the second portion to be part of the active cache is performed in response to receiving the user acceptance of the request; and
    transmitting a message to a cache service provider to initiate a transaction to purchase the second portion of the at least one memory device.

7. The computer program product of claim 1, wherein the at least one memory device is comprised of a plurality of memory modules, wherein the operations further comprise:
    detecting a failure of one of the memory modules implementing of with the active cache; and
    provisioning one of the memory modules unavailable to cache user data to be part of the active cache in response to determining the failure of one of the memory modules used with the active cache to replace the failed memory module.

8. A system coupled to a storage having tracks, comprising:
    a processor;
    at least one memory device;
    a computer readable storage medium having computer program code that in response to being executed by the processor performs operations, the operations comprising:
        maintaining an active cache list indicating tracks in an active cache comprising a first portion of the at least one memory device to cache the tracks in the storage during computer system operations;
        maintaining an inactive cache list indicating tracks demoted from the active cache;
        during caching operations, gathering information on active cache hits comprising access requests to tracks indicated in the active cache list and inactive cache hits comprising access requests to tracks indicated in the inactive cache list, wherein the gathered information indicates cache hits and cache performance that would be realized if an inactive cache was configured for use with the active cache; and
        using the gathered information to determine whether to provision a second portion of the at least one memory device unavailable to cache user data to be part of the active cache for use to cache user data during the computer system operations.

9. The system of claim 8, wherein the operations further comprise:
    providing an active Least Recently Used (LRU) list in which tracks included in the active cache are indicated, wherein the inactive cache list comprises an inactive LRU list.

10. The system of claim 8, wherein the operations further comprise:
    in response determining that the active cache list is full:
        demoting a track from the active cache list to provide space in the active cache list for a track requested by an access request;
        determining whether the inactive cache list is full;

demoting a track from the inactive cache list in response to determining that the inactive cache list is full; and adding the track demoted from the active cache list to the inactive cache list.

11. The system of claim 8, wherein tracks indicated in the inactive cache list are not stored in the at least one memory device.

12. The system of claim 8, wherein the operations further comprise:

determining whether to provision a second portion of the at least one memory device unavailable to cache user data to be part of the active cache; and configuring the second portion to be part of the active cache to cache user data during the computer system operations.

13. The system of claim 12, wherein the operations further comprise:

presenting a request to a user to expand the active cache in response to determining to provision the second portion of the at least one memory device;

receiving, from the user, acceptance of the request, wherein the configuring the second portion to be part of the active cache is performed in response to receiving the acceptance of the request; and transmitting a message to a cache service provider to initiate a transaction to purchase the second portion of the at least one memory device.

14. The system of claim 8, wherein the at least one memory device is comprised of a plurality of memory modules, wherein the operations further comprise:

detecting a failure of one of the memory modules implementing of with the active cache; and provisioning one of the memory modules unavailable to cache user data to be part of the active cache in response to determining the failure of one of the memory modules used with the active cache to replace the failed memory module.

15. A method for managing a cache provisioned in at least one memory device in a computer system to cache tracks stored in a storage, comprising:

maintaining an active cache list indicating tracks in an active cache comprising a first portion of the at least one memory device to cache the tracks in the storage during computer system operations;

maintaining an inactive cache list indicating tracks demoted from the active cache;

during caching operations, gathering information on active cache hits comprising access requests to tracks indicated in the active cache list and inactive cache hits comprising access requests to tracks indicated in the inactive cache list, wherein the gathered information indicates cache hits and cache performance that would be realized if an inactive cache was configured for use with the active cache; and using the gathered information to determine whether to provision a second portion of the at least one memory device unavailable to cache user data to be part of the active cache for use to cache user data during the computer system operations.

16. The method of claim 15, further comprising:

providing an active Least Recently Used (LRU) list in which tracks included in the active cache are indicated, wherein the inactive cache list comprises an inactive LRU list.

17. The method of claim 15, further comprising:

in response determining that the active cache list is full:

demoting a track from the active cache list to provide space in the active cache list for a track requested by an access request;

determining whether the inactive cache list is full;

demoting a track from the inactive cache list in response to determining that the inactive cache list is full; and adding the track demoted from the active cache list to the inactive cache list.

18. The method of claim 15, wherein tracks indicated in the inactive cache list are not stored in the at least one memory device.

19. The method of claim 15, further comprising:

determining whether to provision a second portion of the at least one memory device unavailable to cache user data to be part of the active cache; and configuring the second portion to be part of the active cache to cache user data during the computer system operations.

20. The method of claim 19, further comprising:

presenting a request to a user to expand the active cache in response to determining to provision the second portion of the at least one memory device;

receiving, from the user, acceptance of the request, wherein the configuring the second portion to be part of the active cache is performed in response to receiving the acceptance of the request; and transmitting a message to a cache service provider to initiate a transaction to purchase the second portion of the at least one memory device.

* * * * *